Feb. 26, 1929.
A. SLATEN
BUTTER CUTTER
Filed Oct. 10, 1927 5 Sheets-Sheet 1
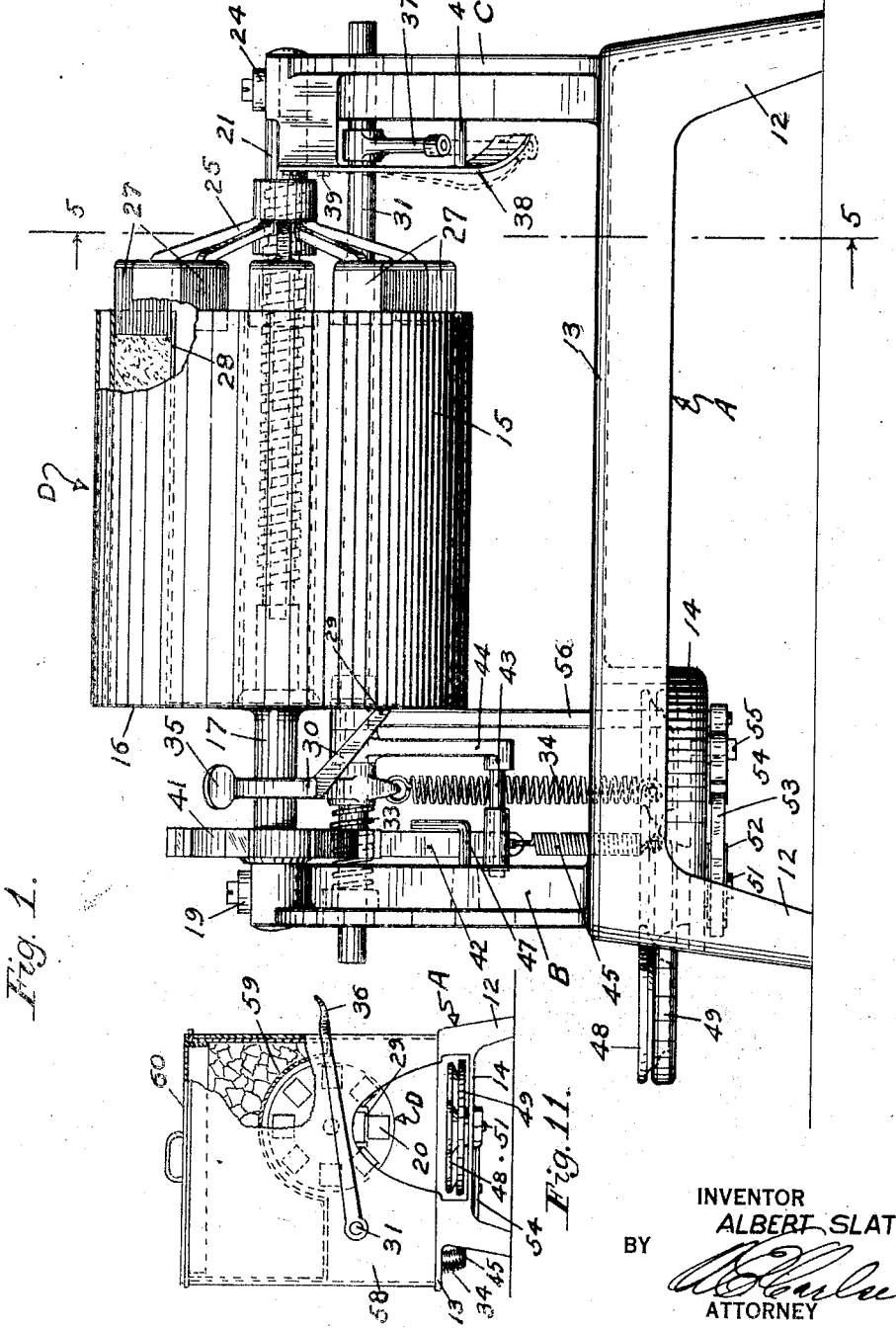
INVENTOR
ALBERT SLATEN
BY
ATTORNEY

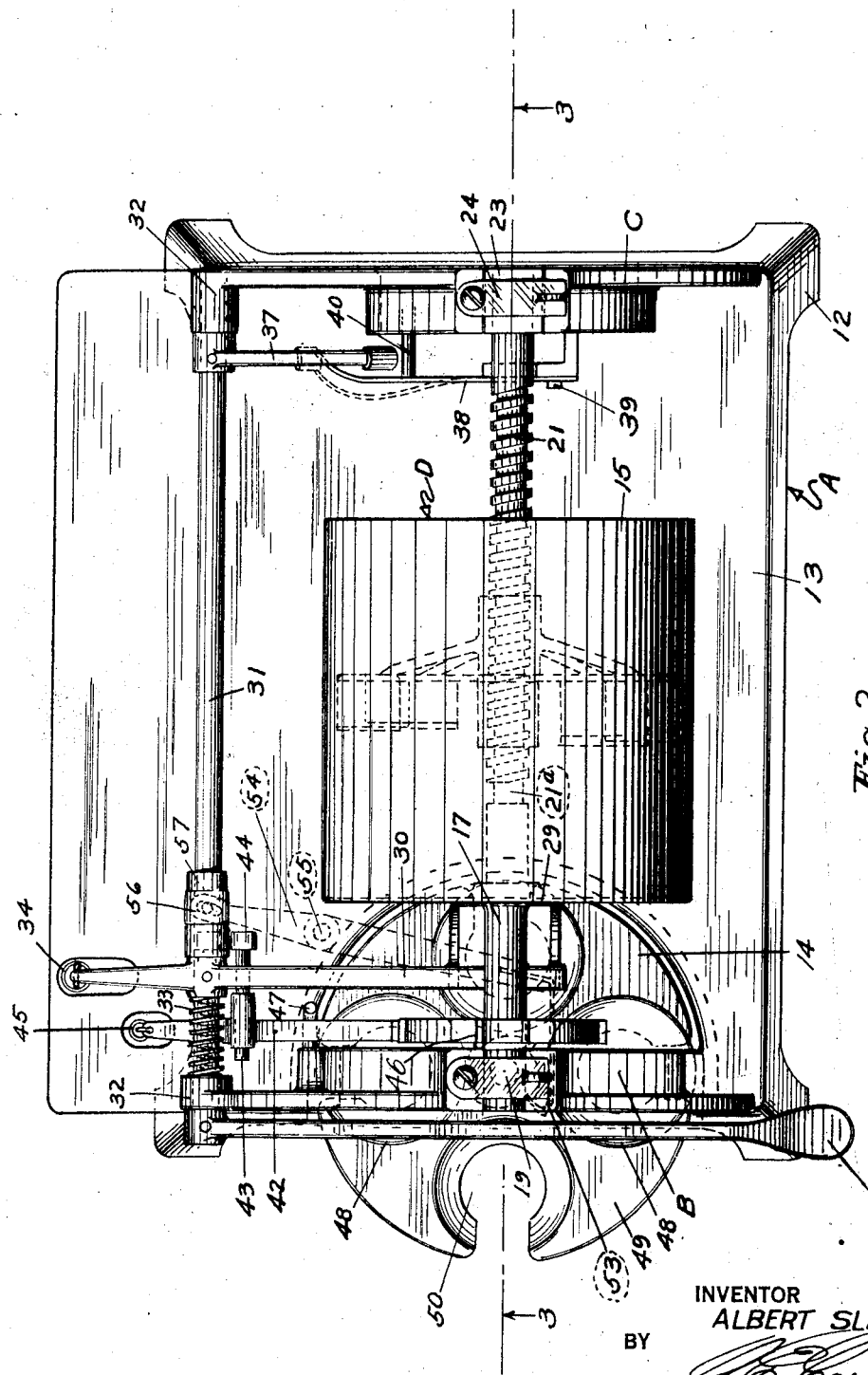

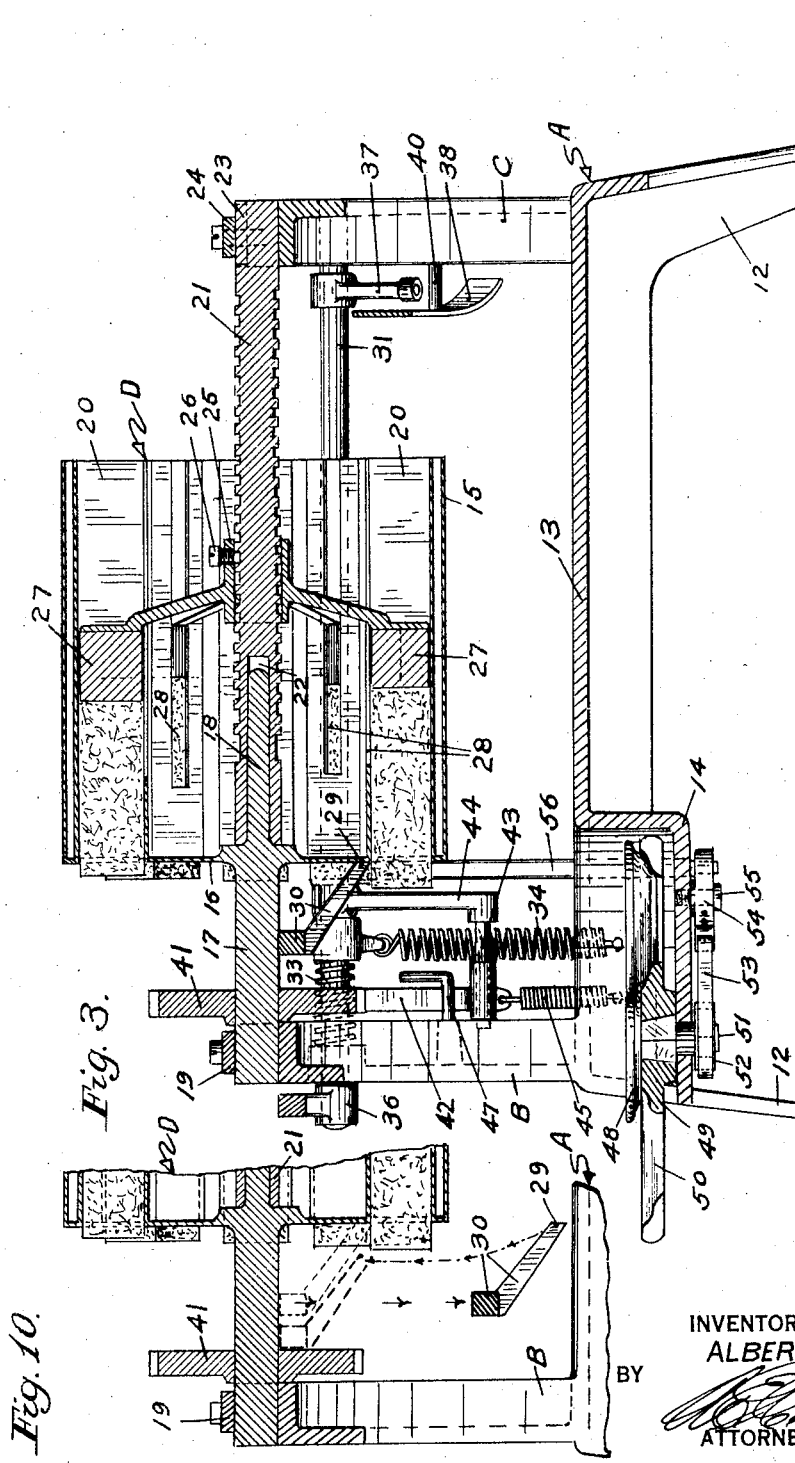

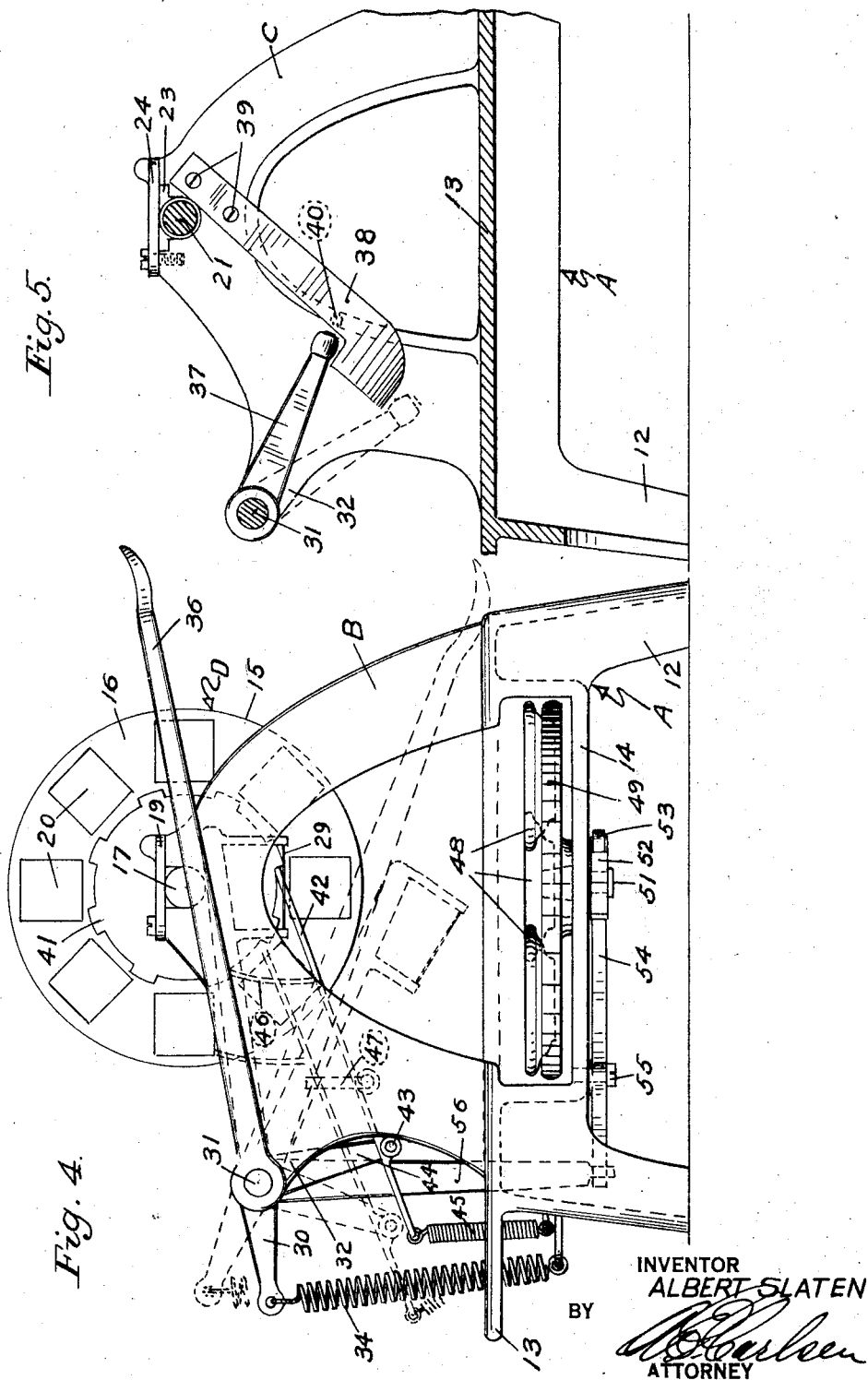

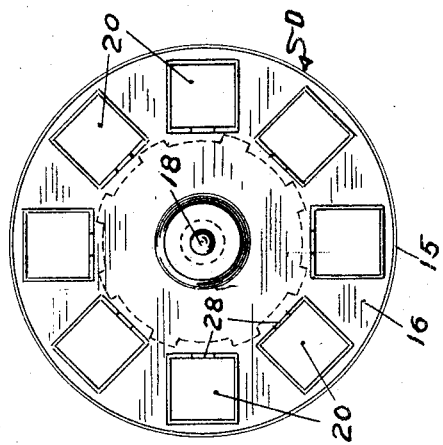
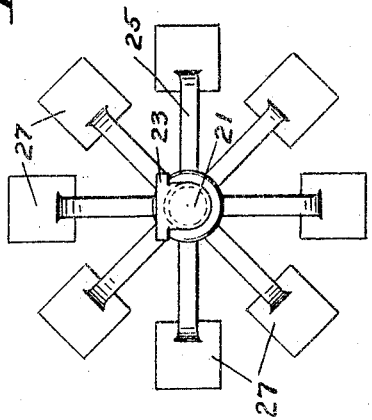
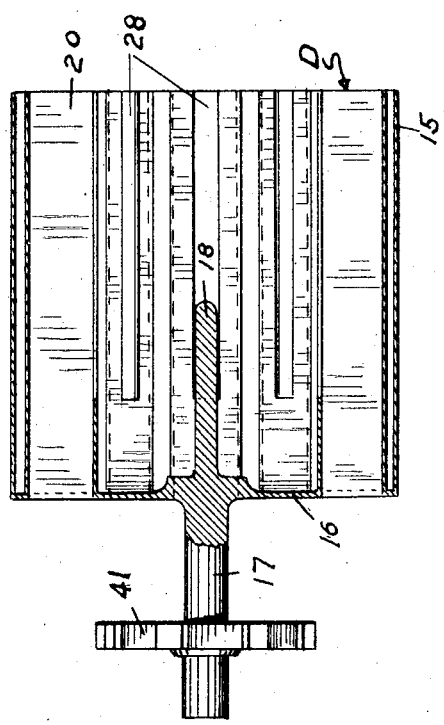
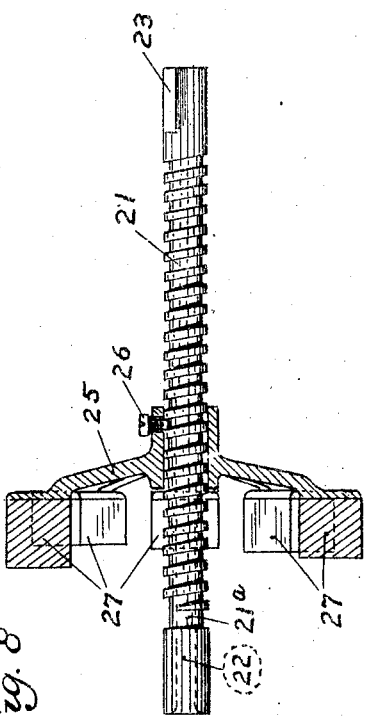

Patented Feb. 26, 1929.

1,703,553

UNITED STATES PATENT OFFICE.

ALBERT SLATEN, OF MINNEAPOLIS, MINNESOTA.

BUTTER CUTTER.

Application filed October 10, 1927. Serial No. 225,304.

This invention relates to butter cutting equipment for hotels, restaurants, and similar places where large quantities of individual butter pats or "chips" are used, and the primary object is to provide means of a novel, practical, and efficient nature for cutting blocks of butter up into such pats and delivering them to small plates, in which they are distributed to the guests and patrons. A further object is to provide a butter cutter which is extremely simple in construction, and in which the butter holder and related parts may be quickly removed and replaced, for the purpose of cleaning, refilling, etc. Still further and more specific objects will be disclosed in the course of the following specification, reference being had to the accompanying drawings, wherein:

Fig. 1 is a right side elevation of the machine, with fractional portions broken away and with the surrounding housing and ice container removed.

Fig. 2 is a plan view of the machine as shown in Fig. 1, and as slightly modified therefrom.

Fig. 3 is a sectional elevation on the line 3—3 in Fig. 2.

Fig. 4 is a front elevation of the machine, as shown in Fig. 2.

Fig. 5 is a detailed sectional view on the line 5—5 in Fig. 1.

Fig. 6 is a detail view, mostly in section, of the butter carrying drum.

Fig. 7 is a rear end view of the butter drum.

Fig. 8 is a detail view of the feed screw, and showing the feed spider in vertical section.

Fig. 9 is a rear elevation of the feed spider and screw, as seen from the right in Fig. 8.

Fig. 10 is a detail section, similar to the left end of Fig. 3, but showing some parts in other positions, and omitting other parts.

Fig. 11 is a front elevation of the machine on a reduced scale, and showing a portion of the housing and ice compartment as broken away.

Referring to the drawings more particularly and by reference characters A designates a base having legs 12, and a base plate 13 which is off-set downwardly, as at 14, in a pocket or plate section at the front part of the base. At its front and rear ends the base is provided with a pair of arched standards B and C which support substantially the entire butter cutting mechanism.

The butter carrier proper is designated by the letter D, and consists of a cylindrical drum 15 having an end wall 16 with which is integrally formed a spindle member 17—18. The spindle section 17 is removably secured in a bearing socket, of the standard B, by a latch 19. The drum 15 is provided with an annular series of spaced chambers 20, which extend from the wall 16, and are open at both ends. These chambers are of a size to conveniently receive quarter pound strips or blocks of butter. A worm screw 21 extends axially into the drum and, at its inner end, has a socket 22 for rotatably receiving the spindle section 18, while its outer or rear end has a flattened face 23 whereby it may be non-rotatably yet detachably secured in the standard C, as by a latch 24, which is similar to 19. Thus, the drum and worm are releasably secured in axial alignment, but only the former is free to rotate.

The worm 21 carries a spider like butter actuator 25, the same having a stud screw 26, which engages the worm 21, so as to advance the spider when the same is rotated. It may here be noted (see Fig. 8) that the screw 21 is provided, at its forward end, with an annular slot 21ª, so that when the screw stud 26 has travelled its forward course the spider 25 may rotate idly and not bind or stop on the worm.

The spider arms are provided at their outer ends with push blocks 27 which are so spaced that each will slidably fit in one of the chambers 20, and the inner walls of these chambers are provided with slots 28 to slidably receive the arms of the spider. The blocks 27 have their front or butter engaging faces offset with respect to each other, i. e., the blocks are of successively varying lengths, whereby the butter blocks will be successively projected from the drum, and, as one butter pat is cut from each butter block for each rotation of the drum, it will be seen that the pitch of the screw 21 will determine the size or thickness of butter pat to be cut, and that the gradual offsetting of the blocks 27 will permit the first and last pats from each butter block to be cut with uniform thickness.

The butter is cut by a wire 29 carried in a cutter fork lever 30, secured on a bar 31, so that the wire can travel up and down in front of the lowermost chamber 20. The shaft 31 is rotatably and slidably mounted in bearings 32 of the standards B and C. The shaft 31 is yieldingly held rearwardly by a spring 33, so that the wire 29 will be closed against the drum face 16, and a spring 34 serves to keep the cutter fork 30 in a yieldingly upward position.

The cutter fork may be actuated by a handle extension 35, as shown in Fig. 1, in which event the handle would project through a suitable slot in the outer housing, but I prefer to oscillate the shaft 31, by a separate hand lever 36, as shown in Figs. 2, 3, 4 and 11, which is attached to the front projecting end of the shaft. At its rear end I provide the shaft 31 with a rigid arm 37, adapted to engage a curved spring tongue 38. This tongue is secured, as at 39, to the standard C, and at a lower point abuts against a stationary pin 40. When the operating lever is now pressed down to cut off a butter pat, it will be seen that the cutting wire will travel vertically downward and the arm 37 will merely spring the tongue 38 forward as it travels down. When the handle is released the spring 34 restores the parts to their initial positions, but in order to prevent injury to the next advancing butter block it is necessary to space the cutting fork from the drum as the wire moves upwardly. This is done by the arm 37 which as it engages the curved forward face of the spring 38 moves the rod 31 (and the fork 30) forward against the spring 33. The pin 40 holds the tongue 38 sufficiently rigid during this action, and as soon as the arm 37 can escape from the spring it permits the parts 29—31 to return to their initial positions. The action of the fork 30, as influenced by the tongue 38, is illustrated in Fig. 10.

The drum D is intermittently rotated, so as to successively bring the butter cakes into cutting positions, by a toothed wheel 41 carried on the spindle section 17, and having one tooth for each chamber 20. This wheel is intermittently actuated by a pawl lever 42, which fulcrums as at 43, on an arm 44, carried by the shaft 31. A spring 45 tends to hold the pawl up in engagement with the wheel 41, and an extension finger 46, of the lever 42 acts as a stop against the wheel 41 to limit the drum turning action of the pawl, and stop the drum at the desired positions. An L-shaped pin or hook 47 also acts as a sliding rest for the member 42 and limits its downward movement. The pawl lever 42 has a sliding engagement with the fulcrum pin 43, so that it need not move back and forth with the shaft 31, and thus be disengaged from the wheel 41, and the hook 47 also serves to thus hold it against back and forward movement with the pin 43.

As the butter pats are successively cut from the blocks of butter, they drop upon small plates 48 which are placed upon and carried by a table 49. This table is provided with spaced pockets or recesses 50, for receiving the plates, and each pocket opens to the periphery of the table so that the finger may be inserted under each plate to remove the same. The table 49 is rotatably carried upon the shelf 14 and has a shaft 51 to the lower end of which is a ratchet wheel 52, having one tooth for each plate pocket. A spring pawl 53 operates the ratchet and is carried on a lever 54 which is pivoted, as at 55, under the base. The left end of the lever 54 (as seen in Fig. 4) is operated by an arm 56 that drops down from and reciprocates back and forth with the shaft 31, to which it is held by a collar 57. Thus, for each pat of butter delivered the turntable 49 will be rotated until the next empty plate 48 is in a butter receiving position.

As shown in Fig. 11, substantially all of the operating mechanism of the machine is inclosed in a housing 58, which is easily removable to give access to the interior of the machine. In the upper part of this housing, I arrange an ice chest 59, the same extending closely over the butter drum D so as to keep the butter cold. This container is provided with a suitable cover 60.

When the butter drum becomes exhausted, it is a simple matter to first remove the ice chest or the housing 58, after which the clips 19 and 24 are turned, and the drum D, the spider 25 and the worm 21 are then removed, plunged into scalding water if desired, refilled with butter cakes, and replaced in the machine, after which the machine is again in readiness to be further operated.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. In a butter cutting machine, a series of spaced butter chambers rotatable about a common axis, a worm arranged centrally within the series, a feeding device mounted on the worm and having heads for respective engagement in the chambers whereby when the device is rotated with the chambers it will advance upon the worm, and a cutting device arranged to successively cut pats of butter, one from each block of butter carried by said chambers.

2. In a butter cutting machine, a series of spaced butter chambers rotatable about a common axis, a worm arranged centrally within the series, a feeding device mounted on the worm and having heads for respective engagement in the chambers whereby when the device is rotated with the chambers it will advance upon the worm, and a cutting device arranged to successively cut pats of butter, one from each block of butter carried by said chambers, said feeding heads being successively offset with respect to each other.

3. In a butter cutting machine, the combination including a drum having an annular series of longitudinally disposed butter chambers, means for rotating the drum, means operative upon rotation of the drum for simultaneously and gradually expelling the butter from the chambers, and a cutting device for successively cutting butter pats from the butter as it is expelled from said chambers, said expelling means comprising a spider having a plurality of heads slidably engaging the butter chambers.

4. In a butter cutting machine, the combination including a drum having an annular series of butter chambers, means for rotating the drum, means operative upon rotation of the drum for simultaneously and gradually expelling the butter from the chambers, and a cutting device for successively cutting butter pats from the butter as it is expelled from said chambers, said expelling means comprising a spider having a plurality of heads slidably engaging the butter chambers, and said chambers all being provided with longitudinal slots for receiving the spider arms.

5. In a butter cutting machine, a carrier having an annular series of chambers extending longitudinally thereof and adapted to contain blocks of butter, means for intermittently rotating the carrier, a cutter at one end of the carrier, means, having a plurality of feed heads engageable in the chambers, for feeding the butter toward the cutter, and screw means engageable with the feeding means and operative upon rotation of the carrier to move said feed heads longitudinally of the chambers.

6. In a butter cutting machine, a carrier having an annular series of chambers extending longitudinally thereof and adapted to contain blocks of butter, means for intermittently rotating the carrier, a cutter at one end of the carrier, means, having a plurality of feed heads engageable in the chambers, for feeding the butter toward the cutter, and a non-rotatable worm extending axially into the carrier for engagement with the feeding means.

7. In a butter cutter having a cutting device for cutting the butter into pats, a carrier having an annular series of chambers for containing the uncut butter, a butter feeding device consisting of a screw extending axially of the carrier and having a traveller provided with a series of heads for respective engagement in said chambers, said traveler being rotatable with the drum whereby it will advance on the screw, and means for rotating the carrier.

8. In a butter cutter having a cutting device for cutting the butter into pats, a carrier having an annular series of chambers for containing the uncut butter, a butter feeding device consisting of a screw extending axially of the carrier and having a traveler provided with a series of heads for respective engagement in said chambers, said traveler being rotatable with the carrier whereby it will advance on the screw, and means for rotating the carrier, said feeding device and carrier being detachably secured in the machine whereby they may be quickly removed for purpose of cleaning.

9. In a butter cutting machine having a cutting device, a rotatable carrier having a series of chambers for containing the uncut butter, a non-rotatable feed screw extending with one end into the carrier and having its other end secured to a suitable support, said carrier having a spindle one end of which journals in the feed screw and the other end mounted in a second support, and a feeding device mounted to travel on the feed screw and having heads for sliding engagement in the chambers to press the butter therein toward the cutting device.

10. In a butter cutting machine having a cutting device, a rotatable carrier having a series of chambers for containing the uncut butter, a non-rotatable feed screw extending with one end into the carrier and having its other end secured to a suitable support, said carrier having a spindle one end of which journals in the feed screw and the other end mounted in a second support, and a feeding device mounted to travel on the feed screw and having heads for sliding engagement in the chambers to press the butter therein toward the cutting device, latch devices for securing said feed screw and spindle to said supports whereby the carrier and feed devices may be removed without disturbing other working parts of the machine.

In testimony whereof I affix my signature.

ALBERT SLATEN.